June 2, 1931.  H. A. FOOTHORAP  1,807,906
COMBINED RECORDING AND COMPUTING MACHINE
Filed April 12, 1926  10 Sheets-Sheet 1
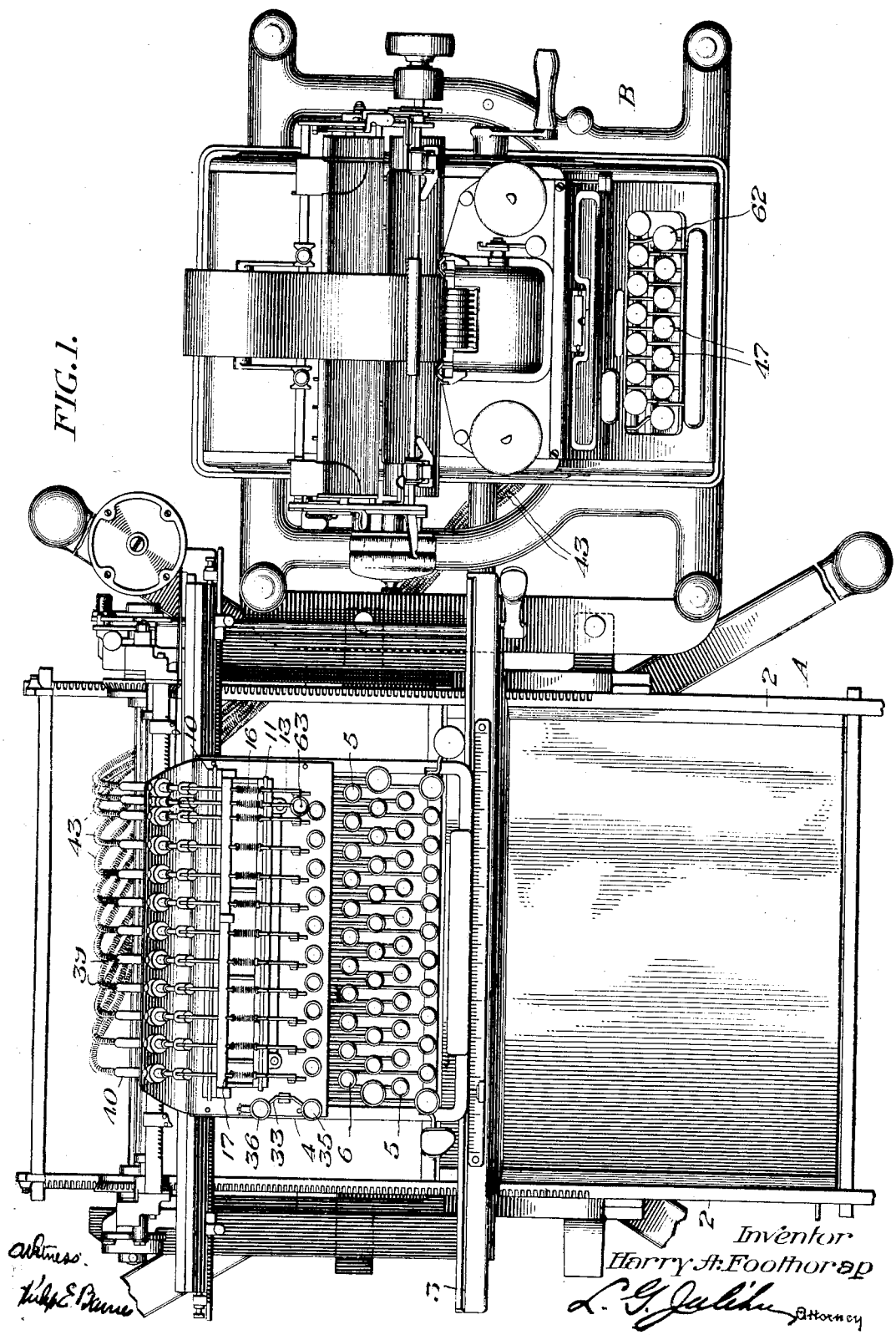

June 2, 1931.  H. A. FOOTHORAP  1,807,906
COMBINED RECORDING AND COMPUTING MACHINE
Filed April 12, 1926   10 Sheets-Sheet 2
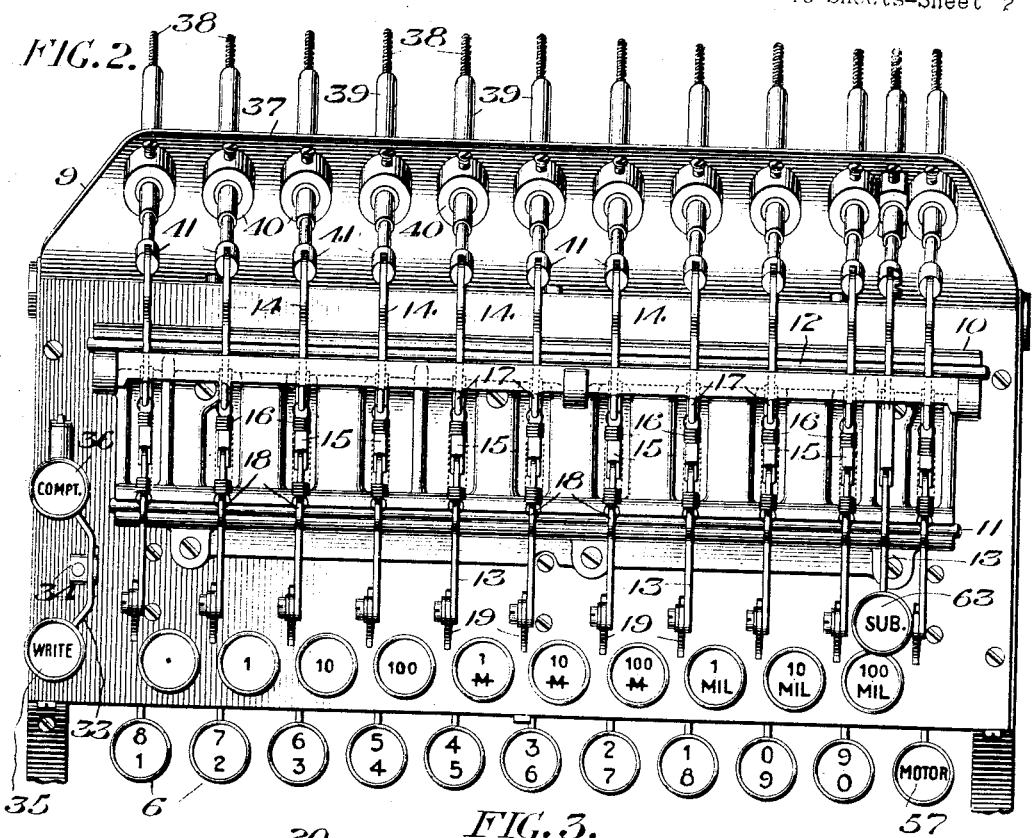
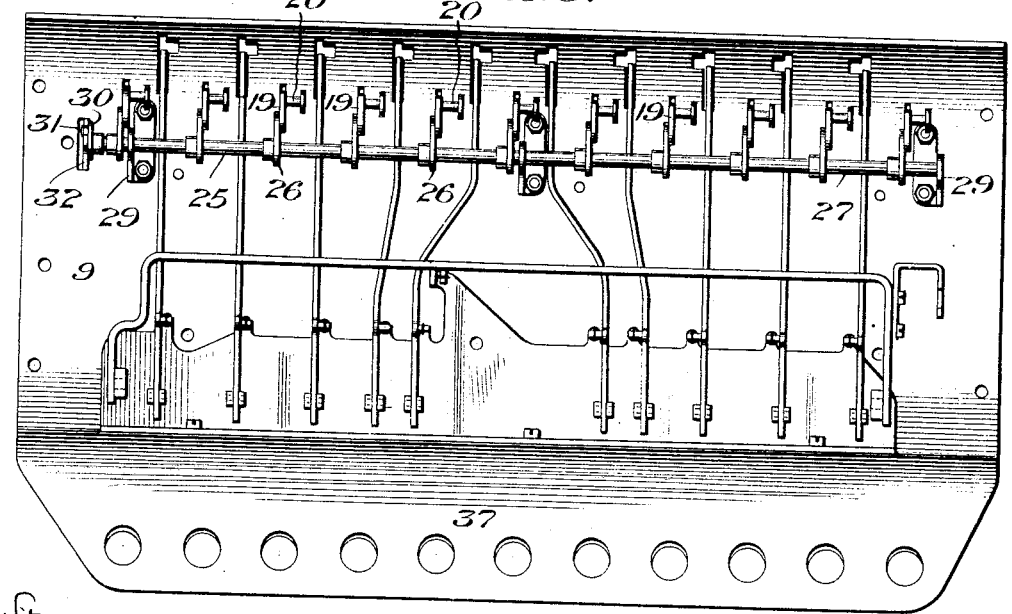

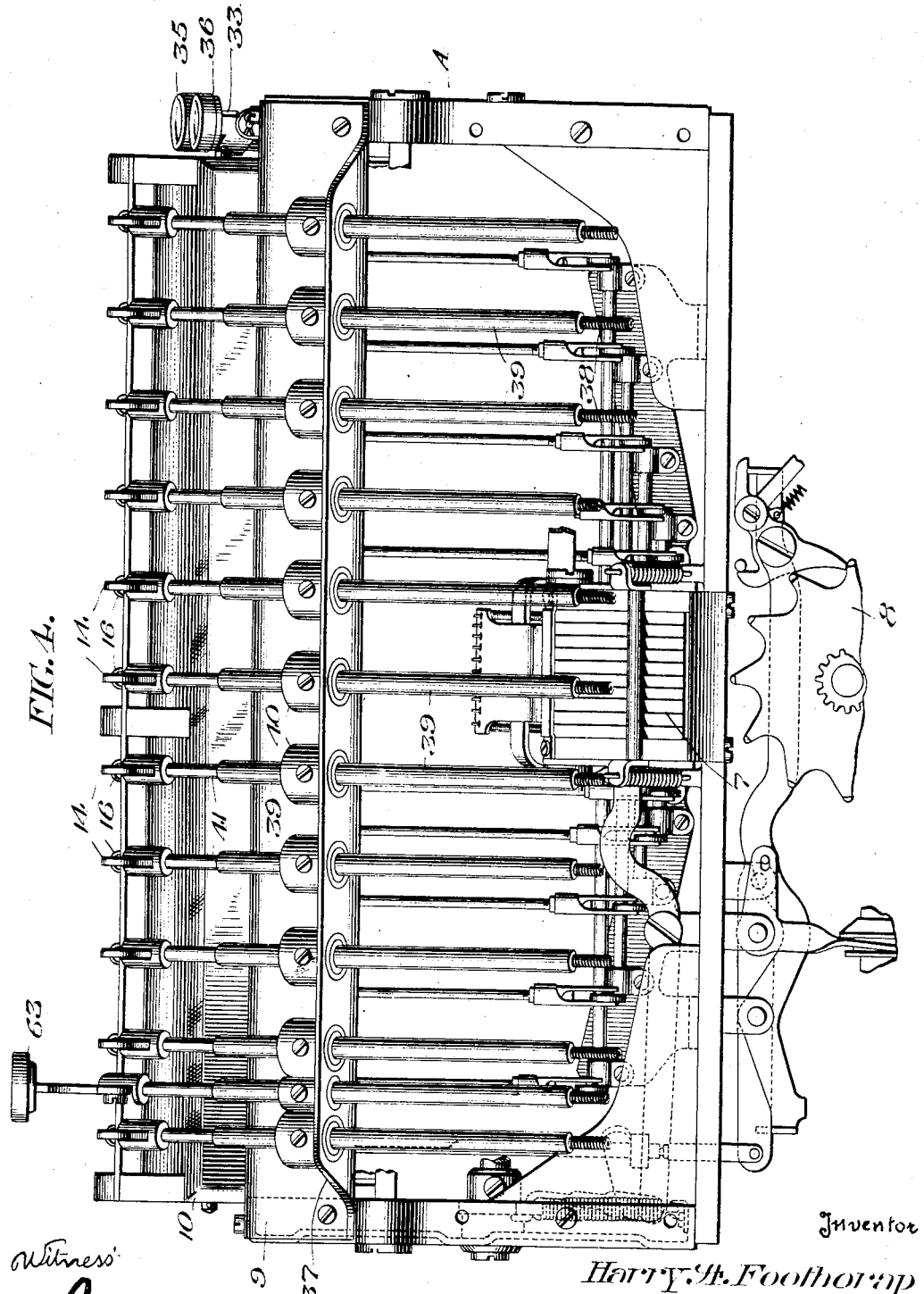

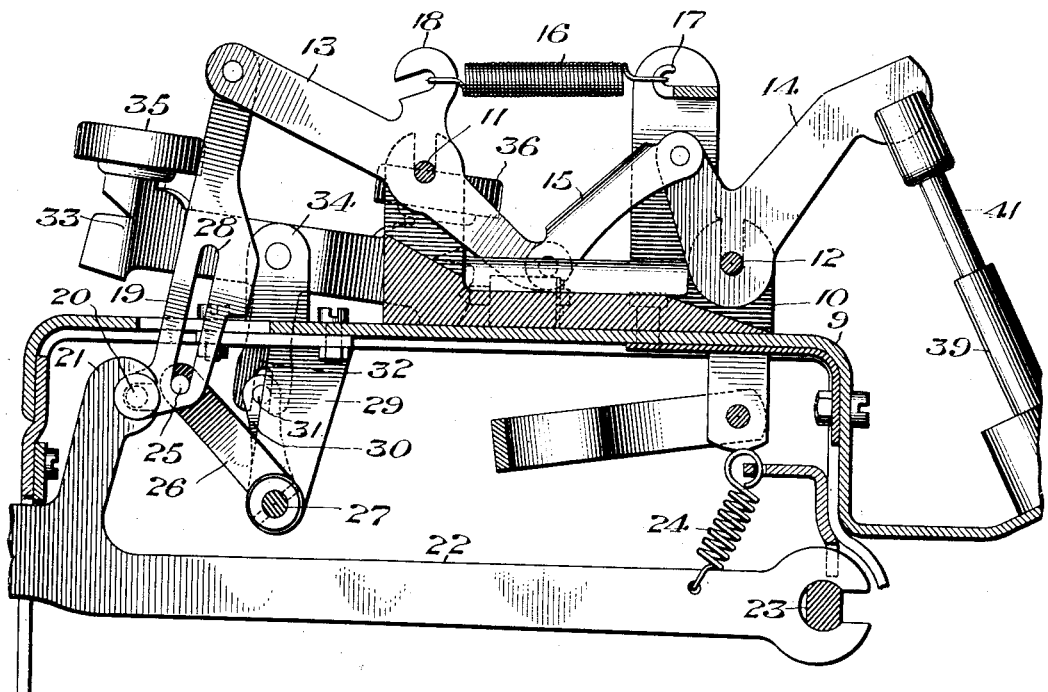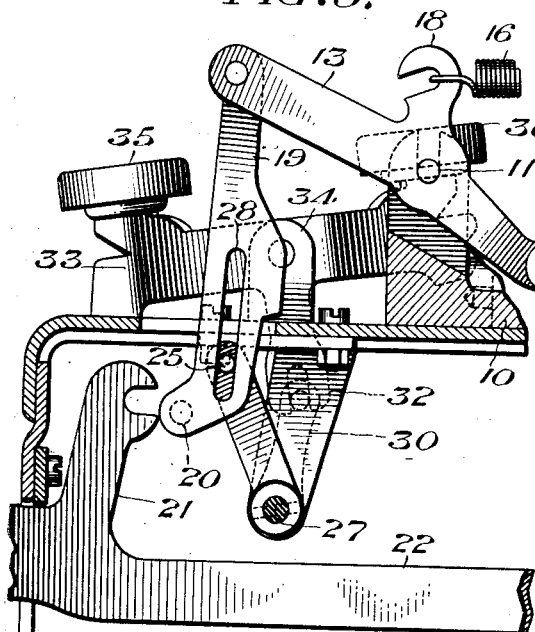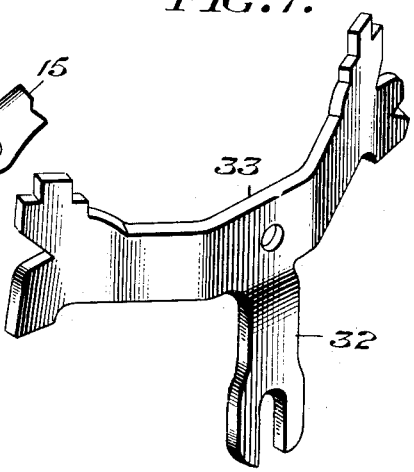

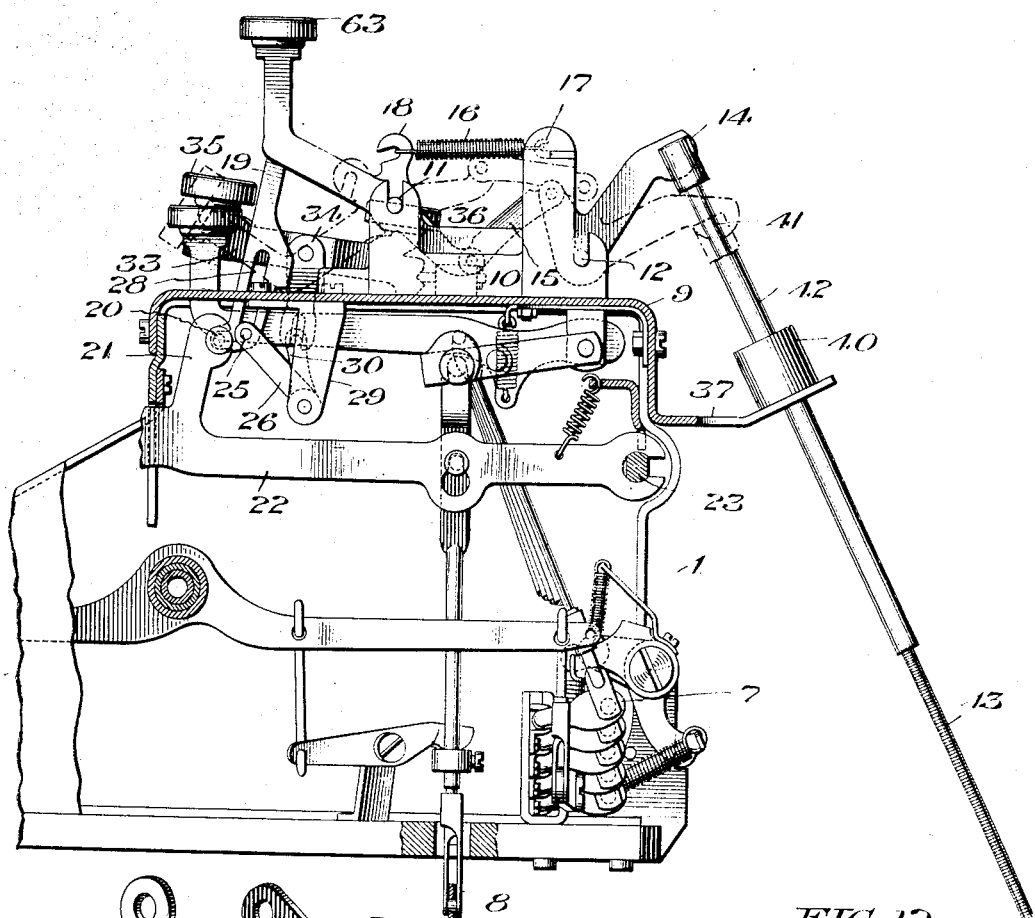
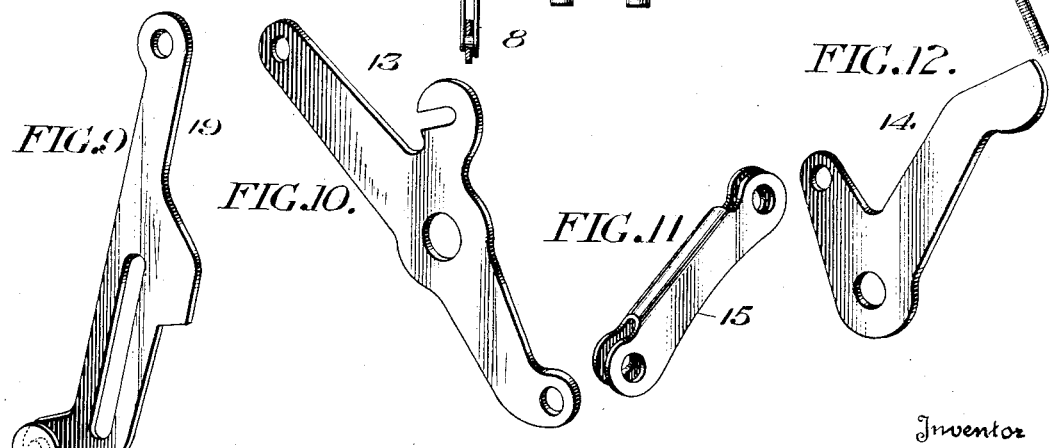

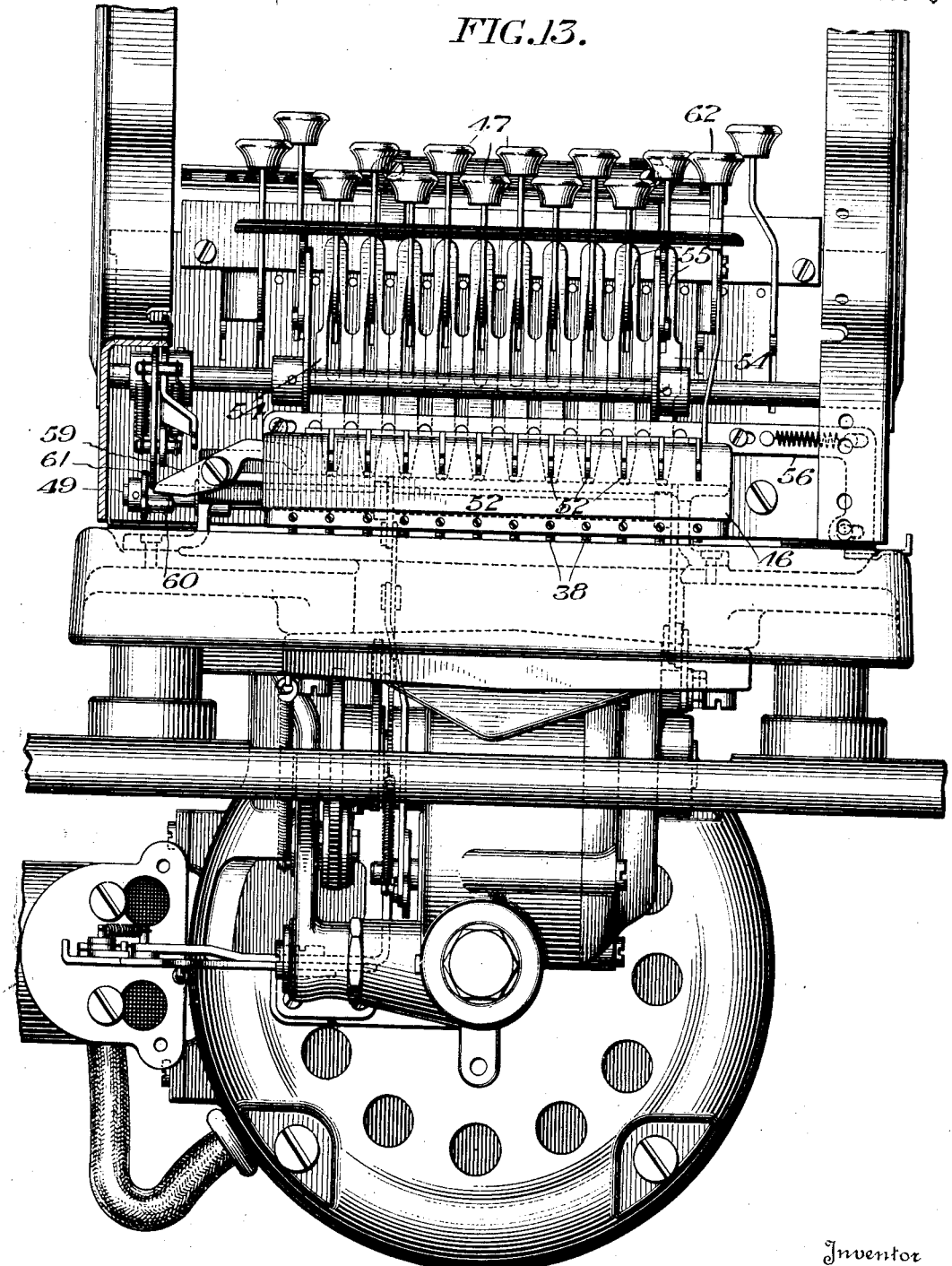

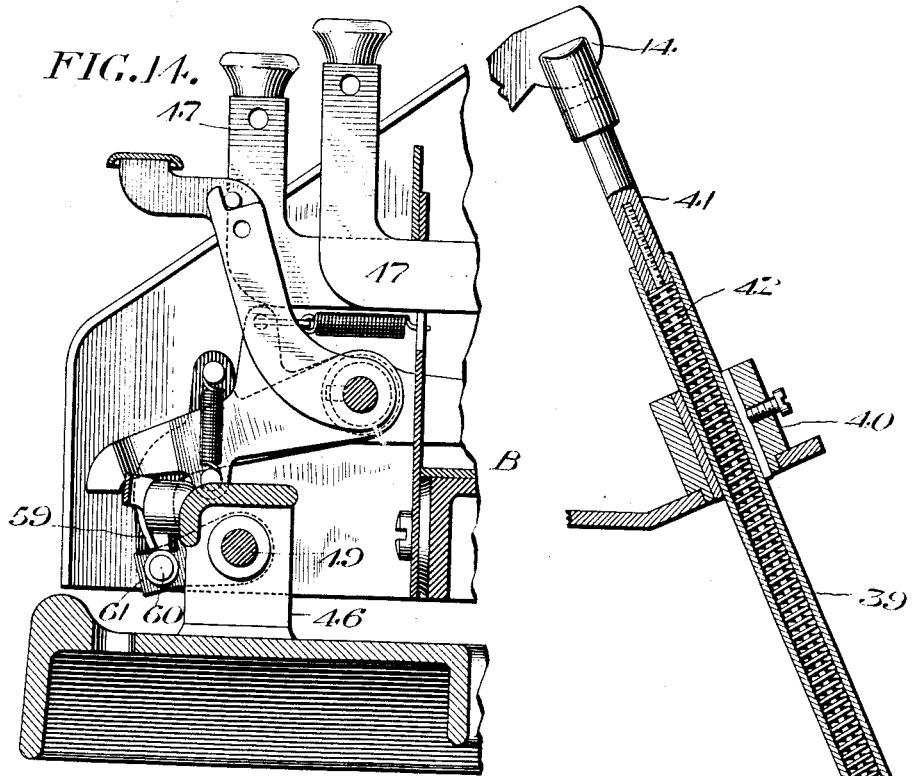

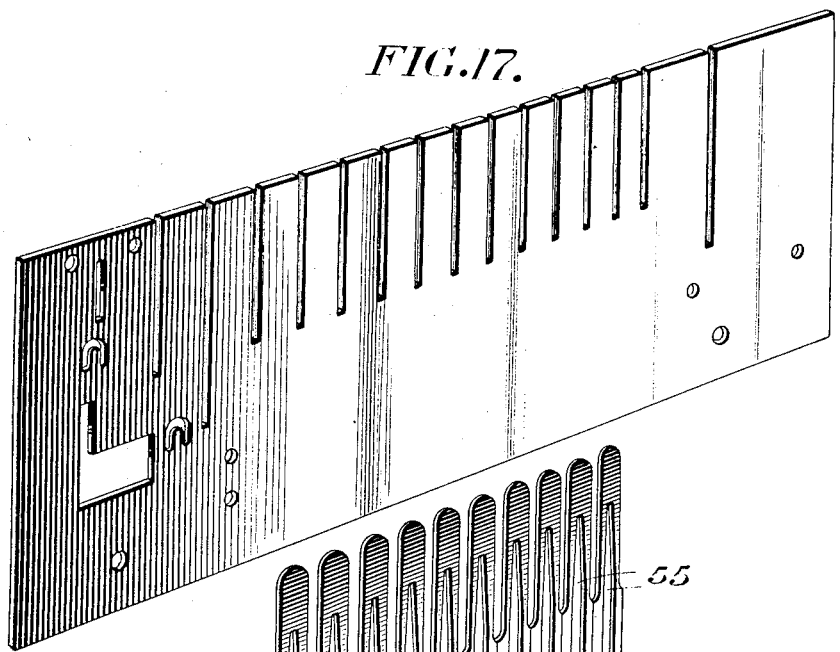
FIG.17.
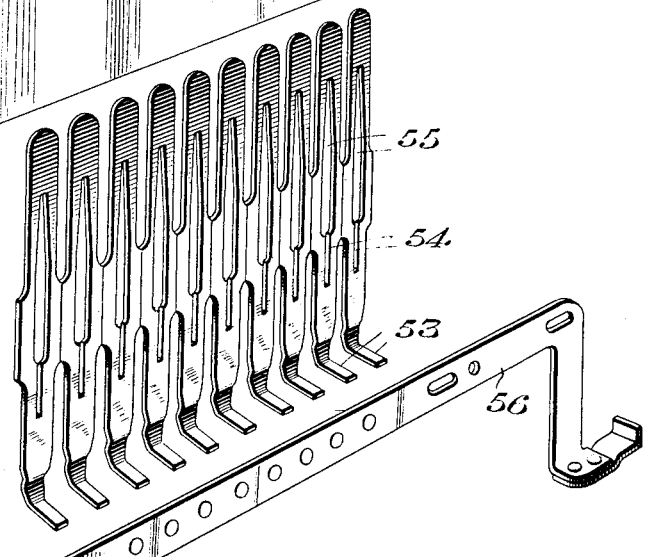
FIG.18.
FIG.19.
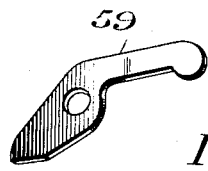
FIG.21.
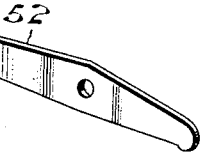
FIG.20.
Inventor
Harry A. Foothorap

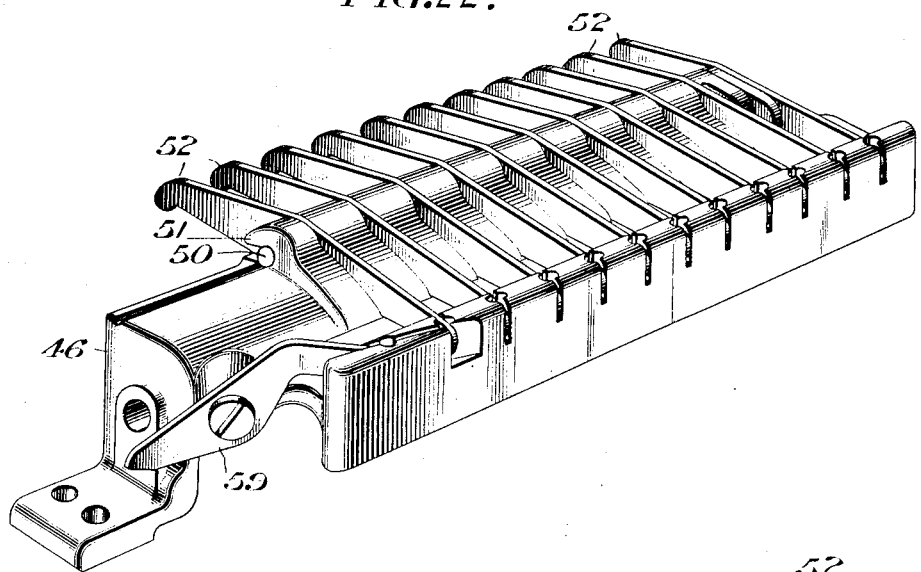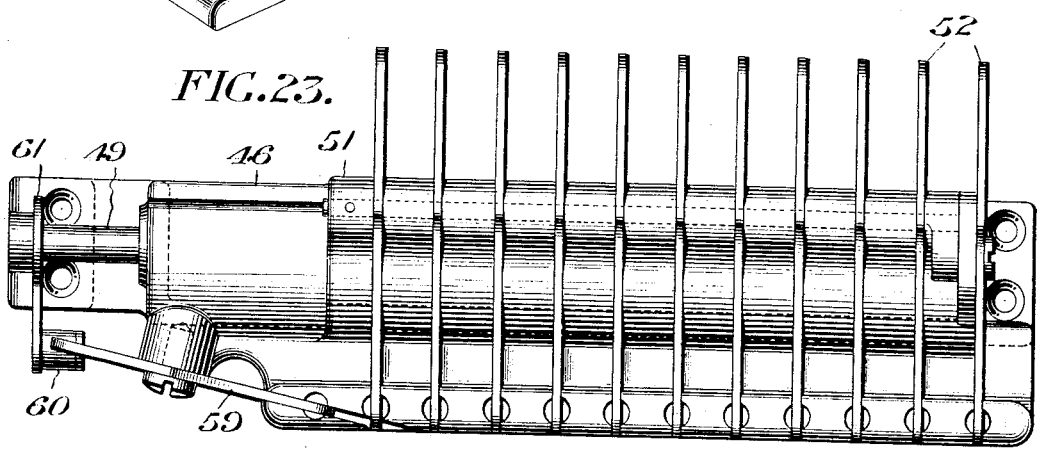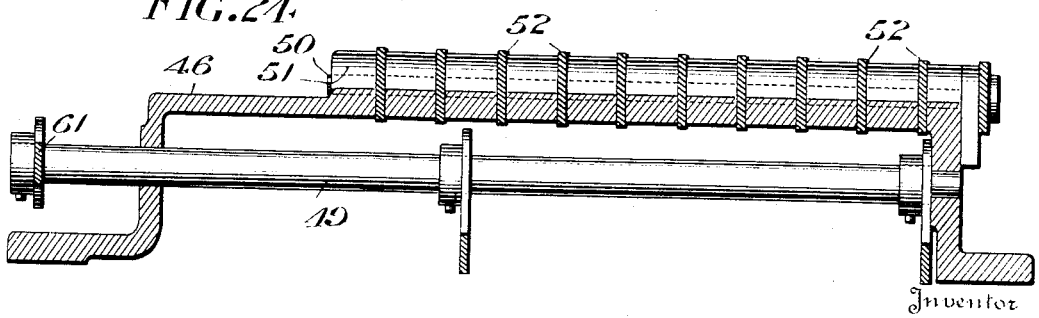

Patented June 2, 1931

1,807,906

UNITED STATES PATENT OFFICE

HARRY A. FOOTHORAP, OF HARRISBURG, PENNSYLVANIA, ASSIGNOR TO ELLIOTT-FISHER COMPANY, A CORPORATION OF DELAWARE

COMBINED RECORDING AND COMPUTING MACHINE

Application filed April 12, 1926. Serial No. 101,500.

This invention relates to a combined recording and computing machine and has for its object to combine in a single machine two machines selected from the recording and computing arts to give a joint result different from that secured by any machine now known.

Another object is to secure in a combined computing-recording machine the many advantages possessed by a typewriter as a recording instrument and the many advantages possessed by a key set computing and listing machine as a computing instrument.

A still further object is to combine with the advantages of a key set computing machine having limited record making facilities the many advantages of a recording machine having a wide range of recording possibilities and the advantage of flat sheet collation for the records to be printed by the recording mechanism and computed by the computing mechanism without the use of more than a single keyboard.

To the accomplishments of these objects and others as will hereinafter more fully appear, one embodiment of the invention resides in the structure shown in the accompanying drawings in which:

Figure 1 is a plan view of my combined recording and computing machine.

Figure 2 is a plan view of the cover plate of the recording unit and the mechanism mounted thereon.

Figure 3 is a bottom plan view of the same.

Figure 4 is a rear elevation of the carriage of the recording unit showing thereon more particularly the mechanism which facilitates the combination of the computing and recording units.

Figure 5 is a section through the upper portion of the carriage of the recording unit and designed more particularly to show the connection between the numeral keys of the recording unit and the operating members whereby said keys are made to operate the keys of the computing unit.

Figure 6 is a similar view of a portion of Figure 5 with the mechanism shown in disconnected position.

Figure 7 is a detail view of the key connecting rocker.

Figure 8 is a sectional view through the rear portion of the carriage of the recording unit showing more distinctly the relation of the novel mechanism to the mechanism of the typewriter.

Figures 9, 10, 11 and 12 are detail views of parts shown in Figure 8.

Figure 13 is a front view of the lower portion of the computing unit.

Figure 14 is a sectional view of the same.

Figure 15 is a detail view showing the arrangement of one of the flexible operating shafts and of the operating and operated members engaged thereby.

Figure 17 is a detail view of the comb plate of the computing unit.

Figure 18 is a perspective view of a group of key operating links.

Figure 19 is a detail perspective view of the manually operated control bar.

Figures 20 and 21 are details of parts.

Figure 22 is a perspective view of a bank of actuating levers for the computing unit and a mounting for said levers.

Figure 23 is a plan view of the same, and

Figure 24 is a sectional view of the subject matter of Figures 22 and 23.

Figure 16:
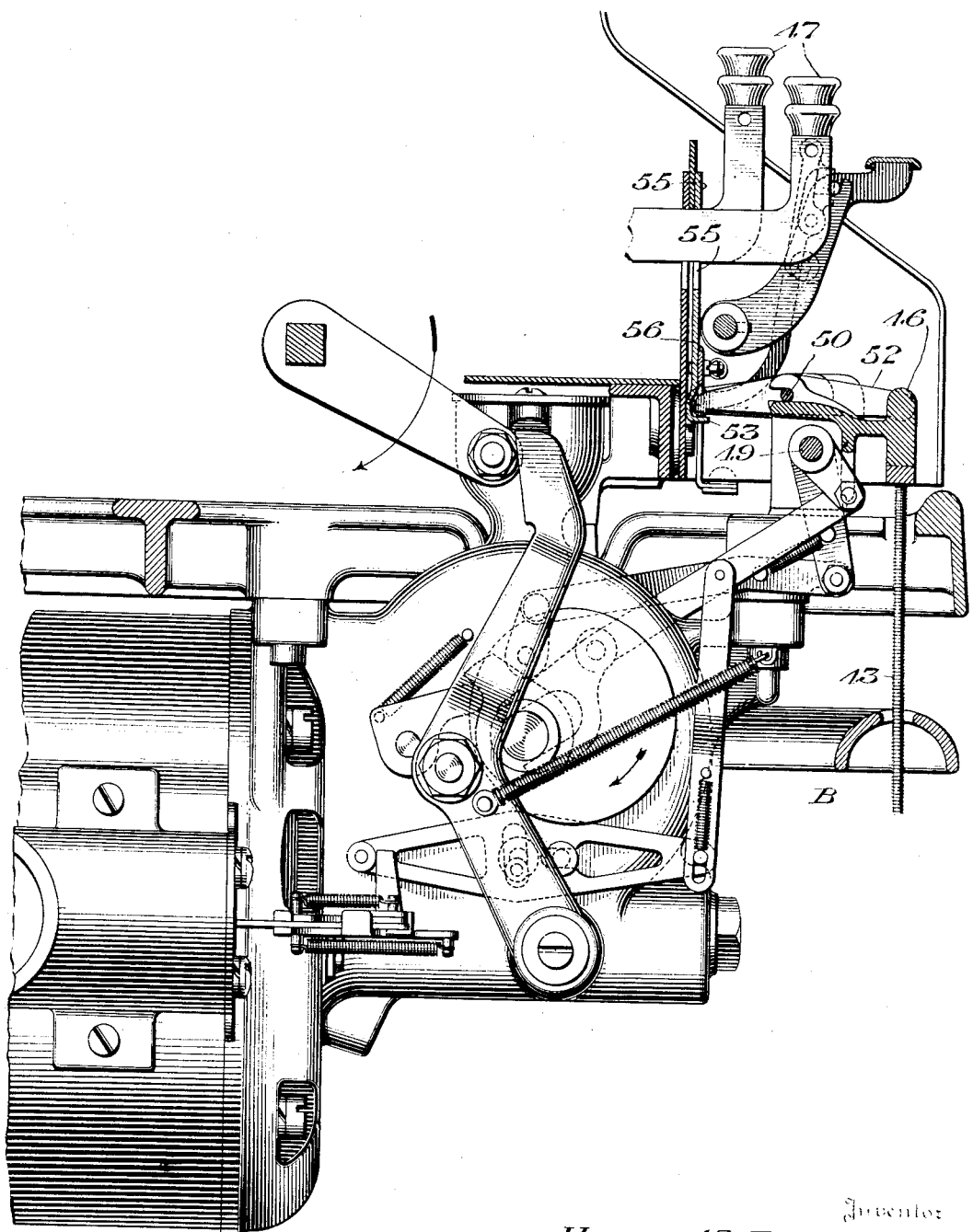
Figure 16 is another section through the front end of the computing unit showing more particularly the relation of the motor and its control to the mechanism connecting the two units.

In the drawings A indicates the recording unit and B, the computing unit. The recording unit is an Elliott-Fisher billing machine and the computing unit is a Dalton adding listing machine, and both of these machines are well known to commerce. The Elliott-Fisher machine is characterized by a flat platen 1 having longitudinal tracks or guides 2 along which travels a line space frame 3 supporting a carriage 4 movable on the frame 3 transversely of the platen 1 and equipped with recording mechanism which includes letter keys 5 and numeral keys 6. The machine is equipped with suitable mechanism common to flat platen typewriters, among which may be mentioned the tabulating mechanism 7, and the carriage feed mechanism 8, both of which are indicated in Figure 4 of the drawings, the tabulating mechanism being also indicated in Figure 8. No attempt has been made to illustrate the various ancillary mechanisms of the Elliott-Fisher machine in detail, it being sufficient for the purposes in this discloseure to note that line spacing of the record printed on flat work sheets backed by the platen 1 is made possible by the movement of the frame 3 while letter spacing of the printed record is secured by the movement of the carriage 4 which is under the control of the recording mechanism to letter space the characters as they are printed.

In accordance with the present invention, it is contemplated to operate the numeral keys of the computing unit B when the numeral keys of the recording unit A are operated to write a number. Certain of the intermediate operating mechanism is mounted on a cover plate 9 which fits over the Elliott-Fisher carriage and is suitably secured thereto. This plate carries a support 10 for front and rear shafts 11 and 12 (Fig. 5) on which are respectively mounted a series of levers 13 and a series of bell cranks 14 connected by a series of links 15 which serve, upon the depression of the front ends of the levers 13, to effect the depression of the rear ends of the bell cranks 14. Retraction of these parts is effected by retracting springs 16 connected at their rear ends to hooks 17 carried by the support 10 and at their front ends to short vertically disposed arms 18 extended laterally from the levers 13. Pendent from the front ends of the levers 13 are key connecting links 19 which extend through the cover plate 9 and are provided at their lower angular ends with lateral studs 20 which engage the rearwardly bifurcated upper ends of arms 21 upstanding from the numeral key levers 22 of the numeral keys 6. The levers 22 are fulcrumed at their rear ends in the usual manner as indicated at 23 and are retracted as usual by springs 24.

Obviously the depression of a numeral key lever 22 will draw down the connected link 19, depress the front end of a lever 13 and similarly depresses the rear end of a bell crank 14 for a purpose which will presently appear.

It is contemplated to so arrange the connection of the mechanism between the recording and computing units A and B that they may be either independent or interdependent in operation. This end is attained by providing means whereby the key connecting links 19 may be connected to or disconnected from the key levers 22. The wrist pins 25 of cranks 26 carried by a rock shaft 27, extend through longitudinal slots 28 in the links 19 and normally serves to guide the links in their longitudinal movement. When it is desired, however, to disconnect the mechanism from the key levers, the cranks 26 whose shaft 27 is journaled in brackets 29 are swung from the position shown in Figure 5 to that shown in Figure 6. For this purpose the shaft 27 is provided with an arm 30 having a lateral stud 31 engaging the bifurcated lower end of the pendent arm 32 of a key connecting rocker 33 journaled on a bracket 34 upstanding from the plate 9. The rocker 33 is equipped at its front and rear ends with keys 35 and 36 which may be depressed accordingly as it is desired to connect or disconnect the recording and computing units.

The rear edge of the cover plate 9 is carried down behind the carriage and then extended outwardly to form a shaft support 37 (Figs. 4 and 8) for a series of flexible operating shafts 38 encased for a portion of their length in shaft tubes 39 mounted in collars 40 carried by the shaft support 37. At its upper end each shaft 38 is provided with a plunger head 41 of cylindrical form preferably screwed on the shaft as shown in Figure 15 and bifurcated for engagement with the rear end of the adjacent bell crank 14. The head 41 extends into the tube 39 and bears against the upper end of a shaft retracting spring 42 coiled about the shaft within the tube 39 and bearing at its lower end against the end of a spiral shaft cover 43 which encases the exposed portion of the shaft 38 and extends into the lower end of the tube 39. When the bell crank 14 is operated, the shaft 38 is moved endwise against resistance of the spring 32 which when permitted will retract the shaft to normal position.

The other ends of the shafts 38 are carried up under the front end of the computing unit or Dalton adder (Figs. 1, 15 and 16) and have vertically disposed plunger heads 44 fitting into vertical openings 45 in a casting 46 extended across the Dalton machine below the front ends of the key levers 47 thereof. The shaft heads 44 are vertically movable in the openings 45 and are retained therein by a bar 48 secured to the casting 46 and apertured at suitable points to receive the other ends of the shaft covers 43 which latter are secured to said bar in any suitable manner.

This casting serves as a bearing and housing for the motor control shaft 49 of the Dalton machine and also carries a longitudinal shaft 50 extended through a comb 51 and supporting a series of actuating levers 52 guided by the comb. The front ends of the levers 52 overlie the heads 44 of the shafts 38 and are elevated thereby upon the depression of a numeral key of the recording unit and the consequent longitudinal movement of the adjacent shaft. The rear ends of the levers 52 overlie the horizontally disposed lower ends 53 of vertically disposed links 54 which hung from the key levers of the Dalton machine and serve to depress the same when the levers 52 are operated by the shafts in the manner stated. The links 54 are provided with elongated slots 55 which receive the key levers and are of such dimensions that they permit the lower ends of the links to be swung laterally by a sliding control bar 56 to withdraw the ends 53 of the links from cooperative relation with the levers 52. It will, therefore, be seen that the key 35 constitutes means for entirely disconnecting from the operating keys of the recording unit, the mechanism whereby the computing unit is operated and that, by means of the control bar 56, the computing unit may likewise be disconnected from the intermediate mechanism. It will be obvious, therefore, that the two units may be jointly operated as the keys of the recording unit are depressed, or if desired, either unit may be operated entirely independently of the other and unencumbered by any of the intermediate mechanism.

It is contemplated that, not only the numeral keys of the Dalton adder will be operated from the keys of the typewriter, but that the motor also of the adder will be controlled from the keyboard of the typewriter. Therefore, at the right hand end of the row of numeral keys of the recording unit (see Fig. 2) is located a motor key 57 which operates one of the flexible shafts 38 which in turn operates a motor control lever 59 (Figs. 22 and 23) fulcrumed on the casting 46 and bearing on a roller 60 carried by an arm 61 extended from the motor control shaft 49 of the Dalton machine. It is also intended to operate the subtraction key 62 of the Dalton adder from the keyboard of the typewriter. A subtraction key 63 is, therefore, mounted at the front end of one of the levers 13 which operates a flexible shaft cooperatively related to the Dalton subtraction key (see Fig. 8). The subtraction key 63 when depressed remains in its depressed position until released.

As will appear by reference to Figure 1, the two units of the machine are mounted together on a stand, but this is not important because by merely lengthening the flexible shafts 38 any relation of units may be accommodated, and it is evident that the flexibility of these shafts accommodates the travel of the carriage and key board of the recording unit so that the record may be made on flat stationary work sheets by travelling printing mechanism which, notwithstanding its travel, is in constant connection with the stationary computing unit which will be controlled from the keyboard of the recording mechanism.

What I claim is:

1. The combination with a typewriter and a computing machine each having numeral keys, of mechanical key operating connections between the numeral keys of the machines, and key operated mechanism for disconnecting said connections from the numeral keys of either machine whereby either machine may be operated entirely independently of the other and of the intermediate operating connections.

2. The combination with a typewriting machine and a computing machine, said typewriting machine including key levers, of means for operating the computing machine from the key levers of the typewriting machine, said means including flexible shafts, and a shaft operating device movable into and out of connection with the numeral keys.

3. The combination with a typewriting machine and a computing machine, said typewriting machine including key levers, of means for operating the computing machine from the key levers of the typewriting machine, said means including flexible shafts, shaft operating device movable into and out of connection with the numeral keys, and keys for connecting and disconnecting said devices.

4. The combination with a computing machine, of a typewriting machine having a series of key levers, flexible operating shafts for the computing machine, shaft operating means mounted on the typewriter and including a series of key connecting links movable into and out of engagement with the numeral key levers, a bail for moving the links into and out of connected position, and a rocker for moving the bail, said rocker being provided with operating keys.

5. The combination with a typewriting machine and a computing machine, having numeral keys of corresponding values, of a mechanical drive mechanism under control of the keys of one machine for operating corresponding keys of the other and including individual motion transmitting elements for each of the driven keys and means individual to each machine for rendering said elements ineffective to operate said driven keys.

6. The combination with a typewriting machine and a computing machine, each including depressible keys, of driving mechanism intermediate the keys of the two machines and including endwise movable shafts, mechanism for imparting end thrust movement to said shafts by depression of the keys of one machine, mechanism operated by such movement of said shafts for depressing the keys of the other machine and means for moving either of said mechanisms to an ineffective position.

7. The combination with a typewriting machine and a computing machine, each including depressible keys, of operating mechanism including a series of plungers mounted beneath the keys of one machine and adapted to be projected upwardly, plunger operated mechanism for depressing said last keys adjustable to an inoperative position to permit independent operation of said last keys, and means for projecting the plungers operated by depression of the keys of the other machine.

8. The combination with a typewriting machine and a computing machine, each including depressible keys, of a series of upright plungers mounted on the back of one machine, a second series of upright plungers mounted beneath the key levers of the other machine, mechanism for depressing the first plungers by operation of their associated keys, connections between the two series of plungers for raising said second plungers by depression of said first plungers, and mechanism operated by said second plungers for depressing their associated keys.

9. The combination with a recording mechanism and a computing mechanism arranged in side by side relation and including a travelling and a stationary set of keys respectively, of mechanical operating connections between the two sets of keys operative to transmit motion from one set of keys to the other in any position of said travelling set, and mechanical devices individual to each machine for disabling the operating connections from either machine to permit independent operation of either set of keys.

10. The combination with a recording mechanism and a computing mechanism arranged in side by side relation and including a travelling and a stationary set of keys respectively, of driving mechanism between the two sets of keys and including individual sets of plungers for each set of keys, connections for actuating one set of plungers by the other, operating connections between each set of plungers and their respective set of keys, and means for disconnecting said operating connections from either or from both sets of keys.

11. The combination with a recording mechanism and a computing mechanism arranged in side by side relation and including a travelling and a stationary set of keys respectively, of driving mechanism between the two sets of keys and including individual sets of plungers for each set of keys, connections for actuating one set of plungers by the other, operating connections between each set of plungers and their respective set of keys, and means including keys individual to each machine for disconnecting said operating connections from either or from both sets of keys.

12. The combination with a recording mechanism and a computing mechanism and including a travelling and a stationary set of keys, respectively, of mechanical operating connections between the two sets of keys operative to transmit motion from one set of keys to the other in any position of said travelling set, and means for disconnecting said operating connections from either machine to permit independent operation of either set of keys.

In testimony whereof I have affixed my signature.

HARRY A. FOOTHORAP.